United States Patent [19]
Gruber

[11] Patent Number: 5,342,128
[45] Date of Patent: Aug. 30, 1994

[54] PIVOT BEARING

[75] Inventor: Walter Gruber, Weinheim, Fed. Rep. of Germany

[73] Assignee: Firma Carl Freudenberg, Weinheim/Bergstr., Fed. Rep. of Germany

[21] Appl. No.: 28,417

[22] Filed: Mar. 9, 1993

[30] Foreign Application Priority Data

May 2, 1992 [DE] Fed. Rep. of Germany ....... 4216557

[51] Int. Cl.⁵ .................. F16C 23/04; F16C 33/74
[52] U.S. Cl. ..................... 384/203; 384/147; 384/206
[58] Field of Search ........ 384/192, 202, 203, 206–213, 384/215, 130, 140, 147, 151, 153

[56] References Cited

U.S. PATENT DOCUMENTS

| 2,188,510 | 1/1940 | Lapsley | 384/213 X |
| 2,606,795 | 8/1952 | Hutton | 384/203 |
| 4,111,499 | 9/1978 | McCloskey | 384/192 |
| 4,883,263 | 11/1989 | Buhl | 267/293 |

FOREIGN PATENT DOCUMENTS 2752456  5/1979  Fed. Rep. of Germany ...... 384/206

Primary Examiner—Thomas R. Hannon
Attorney, Agent, or Firm—Felfe & Lynch

[57] ABSTRACT

An annular body (2) having a spherical outside surface is fixed coaxially on an annular rubber cushion (3) which in turn is fixed coaxially on a mounting rod (10). A guiding ring (4) is supported inside a case (1) and has a spherical inside surface which cooperates with the spherical outside surface of the annular body to permit rotational movement. The case has axial abutments (6,7) which limit rotational movement and serve as fixing points for bellows which protect the joint.

12 Claims, 1 Drawing Sheet

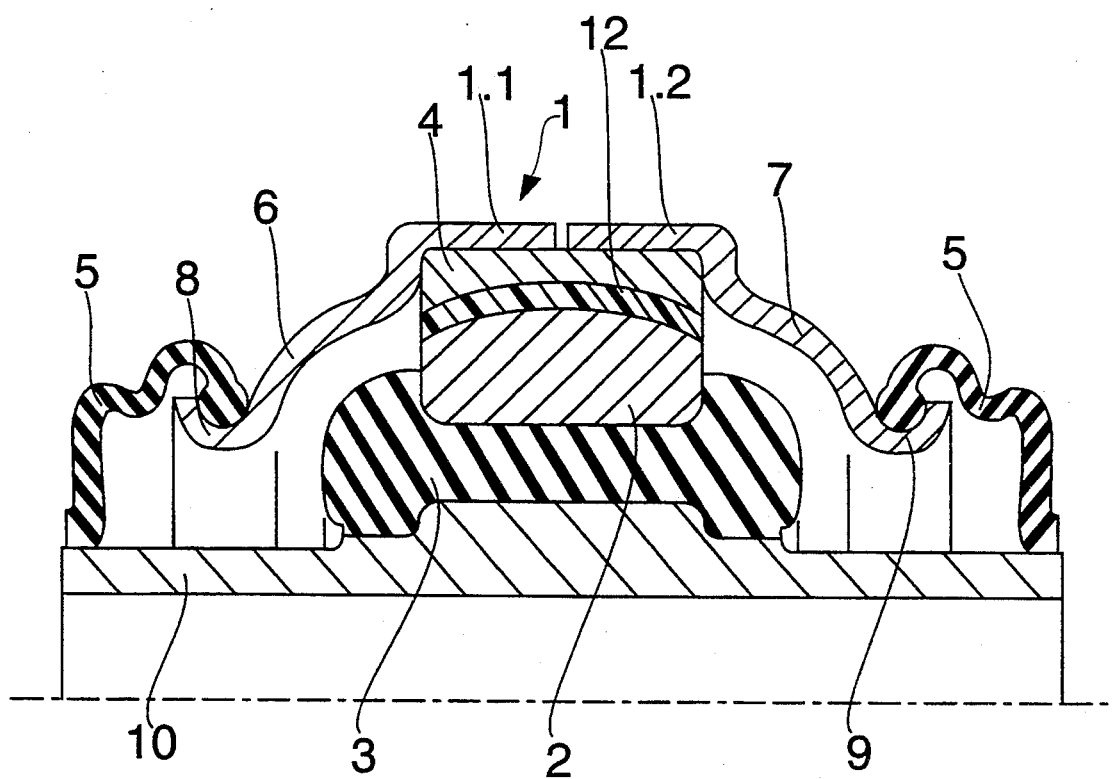

PIVOT BEARING

BACKGROUND OF THE INVENTION

The invention relates to a pivot bearing including a spherical body held in a case and with which a mounting rod is associated in a substantially central manner.

A pivot bearing of this kind is disclosed in U.S. Pat. No. 4,883,263, which is incorporated herein by reference. The pivot bearing is configured as a bearing for axle supports, steering gear or the like in motor vehicles, and has a spherical body which rigidly surrounds a link pin circumferentially. Between the case and the link pin is a sleeve-like link body of elastomeric material under radial bias. At both ends of the elastomeric link body there are supporting rings by which it is held in the case and which simultaneously provide a limit for the deflection movements. The dynamic characteristics of this pivot bearing are not very satisfactory; swiveling angles of more than 10° and low-force swiveling movement cannot be achieved. Furthermore, due to the configuration of the rubber cushion the properties of isolating vibrations produced in operation are not very satisfactory.

SUMMARY OF THE INVENTION

The invention is addressed to the problem of improving the prior art pivot bearing so that swiveling angles of more than 10° can be executed with particularly low force, and so that the pivot bearing will have improved properties for the isolation of vibrations produced in operation.

According to the invention, a body having a spherical outside surface (spherical body) is supported on the mounting rod radially on the inside by a ring-like cushion of rubber. The spherical body is supported in the case radially on the outside by a guiding ring of a hard material, and the body is sealed off by at least one bellows fixed to the case. The pivot bearing is used with preference in the field of wheel guiding means and the steering gear of motor vehicles. In operation, not only great forces occur in the axial and radial direction but also great movements in the joints. The pivot bearing in accordance with the invention can withstand extreme conditions and can absorb high axial forces of, for example, more than 0.5 kN, great radial forces of more than 1 kN, and very great deflection angles of more than 10° under low force. Due to the bellows which seals the case from the spherical body, very good dynamic characteristics are assured over a long period of use. The pivot bearing is thus well protected against external influences.

Since the guiding ring, which has a spherical surface facing the spherical body, does not have a longer axial length than the spherical body, an excellent angular mobility is assured.

According to an advantageous embodiment, the confronting surface areas of the guiding ring and/or of the spherical body are provided with a friction-reducing surface coating such as PTFE, or the guiding ring is made of glass fiber-reinforced PTFE. A good low-force relative mobility between the guiding ring and the spherical body partially covered by the guiding ring is thereby achieved while avoiding life-shortening wear. As regards especially simple, low-cost manufacture, the guiding ring is made of glass fiber-reinforced polytetrafluorethylene. In addition to good dynamic characteristics, such a pivot bearing is distinguished by a comparatively low mass. The spherical body and the cushion can be joined together with an adhesive.

The rubber cushion can have a substantially rectangular cross section with a radial thickness and an axial length, the ratio of the radial thickness to the axial length amounting to 1:15 to 1:10, said axial length being preferably 2 to 5 times greater than said radial thickness. Such a ratio has proven advantageous as regards good dynamic characteristics. On the one hand, a rubber cushion of such a configuration assures good isolation of vibrations caused by operation combined with sufficient cushioning of the case on the spherical body both radially and axially, and on the other hand a precise positioning of the relatively moving parts of the pivot bearing.

In one advantageous embodiment, the guiding ring is disposed in a case of substantially hollow spherical cross section. The case can be divided in the axial direction and can be bipartite, the cushion being joined with adhesive to the spherical body and the mounting rod. To prevent tensions of rubber within the guiding ring the bipartite case can be calibrated, thereby further increasing the useful life.

To limit relative displacements of the case in the axial direction against the spherical body, the case can have on both sides in the area of its lateral inside faces inwardly facing abutment flanges.

The case can have holding means at its lateral faces in which the bellows is held. With an eye to low manufacturing costs and ease of assembly, it is advantageous for the holding means and the abutment flange to be merged into one piece and form components of the case. The radially inward facing surfaces of the case parts can for that purpose be rounded by axially rolling the material. This rounding extends over the entire circumference, so that on the one hand the case is supported against axial movement by the cushion held by the joint and on the other hand a holder for a bellows is formed. The bellows protects the ball joint from contamination and wear.

BRIEF DESCRIPTION OF THE DRAWING

The sole FIGURE is an axial cross section of an embodiment of the pivot bearing according to the invention.

DETAILED DESCRIPTION OF THE PREFERRED EMBODIMENT

In the exemplary embodiment there is shown a pivot joint which consists essentially of a bipartite case 1, including a first cast part 1.1 and a second case part 1.2, a body 2 having a spherical outside surface, a rubber cushion 3, and a guiding ring 4 of a hard material. The two case parts are substantially hollow-spherical and their shape is adapted to the surface of the spherical body 2. The spherical body 2 and the mounting rod 10, which in this example is tubular, are mounted pivotably within the case 1. The guiding ring 4, which is supported on the one hand in the case 1 and on the other hand on the body 2, consists in this embodiment of metal with a nonfriction coating 12 of PTFE, for example. Alternatively, the ring 4 may be glass fiber reinforced PTFE. The ring 4 has a spherical inside surface which cooperates with the spherical outside surface of the annular body to permit rotational movement, and a cylindrical outside surface. The rubber cushion 3 is ring-shaped and surrounds the mounting rod 10 coaxially in an area whose outside diameter is expanded and has a shape favorable to the of the rubber cushion 3. The case parts 1.1 and 1.2 are configured with respective tubular portions which are fit over the cylindrical outside surface of the guiding ring, and abutment flanges 8, 9 which limit rotational movement of the mounting rod in the guiding ring. Intermediate portions 6, 7 extend radially inward from respective tubular portions to respective abutment flanges 8, 9 and have concave surfaces facing the rubber cushion to form the hollow spherical shape. Each flange 8, 9 also serves as holding means for a bellows 5. The parts 1.1 and 1.2 are press fit into a frame or housing which is generally associated with a stationary part, such as an auto body. Alternatively, the parts 1.1 and 1.2 may be held in a bore by a snap ring. The parts 1.1 and 1.2 are preferably identical.

One axial end of bellows 5 is held in the holding means 8 and 9 and the other axial end surrounds the mounting rod 10 with radial bias. No relative displacement takes place between the mounting rod 10 and the bellows 5. The bellows 5 protect the ball joint 2 against dirt and wear and thus assure, even under unfavorable conditions of use, a low-friction relative movement ability and thus good dynamic properties over a long period of use.

I claim:

1. Pivot bearing comprising
   a mounting rod having an axis,
   an annular rubber cushion mounted coaxially about said mounting rod,
   a annular body mounted on said annular rubber cushion and having a spherical outside surface,
   a guiding ring having a spherical inside surface which cooperates with said spherical outside surface of said annular body to permit rotational movement, and an outside surface,
   a case coaxially surrounding said guiding ring, said case comprising a first case portion and a second case portion, each portion comprising a tubular portion fit over the outside surface of the guiding ring, an abutment flange which limits rotational movement of the mounting rod in the guiding ring, and an intermediate portion extending radially inward form said tubular portion to said abutment flange, each said intermediate portion having a concave surface facing said rubber cushion, and
   bellows means extending between said case and said mounting rod.

2. Pivot bearing as in claim 1 further comprising a friction reducing coating on at least one of said spherical inner surface and said spherical outer surface.

3. Pivot bearing as in claim 1 wherein said guiding ring is made of glass fiber reinforced PTFE.

4. Pivot bearing as in claim 1 wherein said rubber cushion has a substantially rectangular cross-section having a radial thickness perpendicular to said axis and an axial length parallel to said axis, said axial length being 2 to 5 times greater than said radial thickness.

5. Pivot bearing as in claim 1 wherein said cushion is adhesively fixed to said annular body and to said mounting rod.

6. Pivot bearing as in claim 1 wherein said flanges each include holding means for attached said bellows.

7. Pivot bearing as in claim 6 wherein each said abutment flange is rolled to form said holding means for attaching said bellows.

8. Pivot bearing as in claim 1 wherein said mounting rod has an expanded outside diameter where said annular rubber cushion is mounted coaxially, said rubber cushion being vulcanized on said expanded outside diameter.

9. Pivot bearing as in claim 1 wherein said guiding ring and said spherical body each have an axial length, the axial length of the guiding ring being not longer than the axial length of the spherical body.

10. Pivot bearing as in claim 1 wherein said outside surface of said guiding ring is cylindrical.

11. Pivot bearing as in claim 1 wherein said case is axially divided between the tubular portions of the first and second case portions.

12. Pivot bearing as in claim 11 wherein the first and second case portions are identical.

* * * * *